United States Patent
Koster (10) Patent No.: US 9,031,212 B1
(45) Date of Patent: *May 12, 2015

(54) DETERMINING A CALL ABANDONMENT RATE USING A SPEECH ANALYTICS SYSTEM

(71) Applicant: Noble Systems Corporation, Atlanta, GA (US)

(72) Inventor: Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,011

(22) Filed: Jan. 22, 2014

Related U.S. Application Data (63) Continuation of application No. 13/758,056, filed on Feb. 4, 2013, now Pat. No. 8,681,955.

(51) Int. Cl.
| | |
|---|---|
| *H04M 15/00* | (2006.01) |
| *H04M 5/00* | (2006.01) |
| *H04M 3/00* | (2006.01) |
| *H04M 3/51* | (2006.01) |
| *H04M 15/10* | (2006.01) |

(52) U.S. Cl.
CPC ............ *H04M 3/5158* (2013.01); *H04M 15/10* (2013.01)

(58) Field of Classification Search
USPC ............... 379/112.01, 112.04, 112.08, 112.1, 379/133, 134, 138, 139, 265.01, 265.02, 379/265.05, 265.1, 266.03, 266.06, 266.09, 379/309
See application file for complete search history.

(56) References Cited

U.S. PATENT DOCUMENTS

| | | | |
|---|---|---|---|
| 5,465,286 A | 11/1995 | Clare et al. | |
| 5,594,790 A | 1/1997 | Curreri et al. | |
| 5,907,601 A * | 5/1999 | David et al. | 379/112.01 |
| 5,926,528 A * | 7/1999 | David | 379/112.01 |
| 6,449,358 B1 | 9/2002 | Anisimov et al. | |
| 7,095,841 B2 | 8/2006 | Mullen | |
| 8,345,856 B1 | 1/2013 | Anisimov | |
| 8,411,844 B1 * | 4/2013 | Anisimov et al. | 379/266.08 |
| 8,582,752 B1 | 11/2013 | Anismov | |
| 8,649,500 B1 * | 2/2014 | Cohen et al. | 379/266.07 |
| 2003/0185352 A1 * | 10/2003 | Savage et al. | 379/67.1 |

(Continued)

OTHER PUBLICATIONS

Daniel A. Edelman, Telephone Consume Protection Act (Junk Faxed, Spam Texts, Robocalls, Telemarketing Abuse), Jul. 23, 2012, 48 pages, Downloaded from http://www.edcombs.com/CM/Custom/TCPA%20article%20sept%202012.pdf.

(Continued)

*Primary Examiner* — Binh Tieu (57) ABSTRACT

In one embodiment, systems and methods are disclosed for processing telemarketing calls to determine an abandonment rate ("AR"). An abandoned call exists if a telemarketing call is answered by a live person and an agent is not connected to the called party within two seconds of the called party completing their greeting. In order to comply with various federal regulations, a feedback mechanism allows feedback of the measured AR to be used by the predictive dialer to manage the AR for future calls to maximize efficiency and avoid exceeding an AR limit. In one embodiment, a speech analytics system processes audio recordings of previously made telemarketing calls and provides feedback to the predictive dialer so as to adjust a target AR rate for future calls.

20 Claims, 7 Drawing Sheets

(56) References Cited

U.S. PATENT DOCUMENTS

| | | | |
|---|---|---|---|
| 2005/0002515 A1 | | 1/2005 | Mewhinney et al. |
| 2005/0207548 A1* | | 9/2005 | Moore et al. .............. 379/112.1 |
| 2005/0207558 A1* | | 9/2005 | Shimpi et al. ........... 379/265.02 |
| 2006/0036487 A1 | | 2/2006 | Mann |
| 2010/0303225 A1 | | 12/2010 | Shashkov et al. |
| 2013/0136248 A1* | | 5/2013 | Kaiser-Nyman et al. ........................ 379/216.01 |
| 2014/0149168 A1* | | 5/2014 | Shashkov et al. ............ 705/7.22 |

OTHER PUBLICATIONS

Noble Systems Corporation, Maestro 2010.1.1 User Manual, vol. 2, Aug. 3, 2010, 416 pages, Noble Systems Corporation, Atlanta GA 30319.

Noble Systems Corporation, Maestro 2010.1.1 Manual, vol. 3: Reports, Aug. 18, 2010, pp. 1-124, Noble Systems Corporation, Atlanta, GA.

Noble Systems Corporation, Maestro 2010.1.1 User Manual, vol. 1, Aug. 17, 2010, 454 pages, Noble Systems Corporation, Atlanta, GA.

* cited by examiner

DETERMINING A CALL ABANDONMENT RATE USING A SPEECH ANALYTICS SYSTEM

CROSS REFERENCE TO RELATED APPLICATIONS

This application is a continuation of U.S. patent application Ser. No. 13/758,056, entitled "Feedback Control of a Predictive Dialer Using Telemarketing Call Abandonment Rates", filed on Feb. 4, 2013, the contents of which are incorporated by reference for all that it teaches.

FIELD OF INVENTION

This disclosure generally relates to concepts and technologies for allowing call centers originating telemarketing calls to comply with regulatory requirements related to telephone call abandonment rates.

BACKGROUND

Call centers may employ predictive dialers for originating telemarketing telephone calls. Predictive dialers process a list of telephone numbers and originate telephone calls for a group of agents with the goal of minimizing agents' waiting times. Predictive dialers do this by "dialing ahead," e.g., they originate more calls than there are currently available agents. This is done based on the expectation that some calls may result in encountering a busy condition, no-answer condition, disconnected status, or answered by an answering machine or voice mail service. Such calls do not need to be connected to an agent, hence not every call made by the predictive dialer needs to be connected to an agent. Predictive dialing is also predicated on agents completing existing calls and therefore becoming available in the near future. Thus, the predictive dialer can originate more calls than there are currently available agents and maintain a likelihood that a live person, when answering the call, is connected to an agent. The goal is to have a call answered by a live person connect with minimal delay to an available agent. Ideally, the called party is connected with an agent just after they answer the call to maximize the agent's utility for communicating with the called party. Ensuring the predictive dialer functions as desired requires knowledge and/or assumptions of various aspects. For example, the predictive dialer may account for: the average hold time for a completed call, the number of agents, when an agent is expected to available, the probability of a call encountering a live called party as opposed to, e.g., the call reaching an answering machine, voice mail, a busy condition, etc. Further complicating the analysis is that some variables, such as the probability of a live person answering the call may vary based on the time of day, the location of the called party, the demographics of the called party, etc.

Developing an effective predictive dialer pacing algorithm can be challenging. In many instances, the goal of connecting calls with minimal delay is at odds with effectively using agents. For example, multiple calls may be made without having the appropriate number of agents available, but with the expectation that an agent may be available. For example, it is possible that two calls may be answered by live called parties but only one agent is available. Or, when a live called party is connected, no agents are currently available. In such situations, an agent may be available by the time the called party completes their greeting, such that the delay of connecting the called party with the next available agent may be minimal. However, the pool of agents may simply be insufficient to connect each encountered called party. This results in the predictive dialer originating a call that is answered by a live called party, but not having a live agent to connect the live called party with. In such situations the predictive dialer may terminate the call, resulting in an abandoned call, or an announcement may be played requesting the called party to wait for an agent.

The practice of a called party receiving an incoming call, answering the call, and providing a greeting only to have the calling party hang-up is considered annoying to many. In response, some federal regulations limit the occurrence of such calls for telemarketing purposes. Exceeding the limit can result in significant fines for the telemarketer originating such calls. While this can be avoided by using a pacing algorithm that ensures an agent is available for each call as it is being initiated, this may result in wasting the agent's time as a number of initiated calls encounter a busy condition, no answer condition, or answering machines. One approach to minimize the likelihood of fines is to operate the predicative dialer so that it maintains a very low average abandonment rate. However, it may be possible to operate the predictive dialer at a higher rate and still comply with applicable regulations.

Thus, a more accurate approach for pacing predictive dialers is required to ensure that call center resources are maximized, but which also complies with federal regulations regarding a maximum abandonment rate. It is with regard to this and other aspects that the present disclosure is presented.

BRIEF SUMMARY

Technologies are generally presented herein pertaining to monitoring the abandonment rate for calls made for a telemarketing calling campaign using a speech analytics system for a past time period and adjusting a target abandonment rate for future calls made for the calling campaign so that a defined average abandonment rate is not exceeded. In one embodiment, the past time period does not extend beyond 30 days and the defined average abandonment rate is 3%.

In various embodiments, a speech analytics system may analyze call recordings associated with the calling campaign to determine an abandonment rate for the analyzed call recordings. In particular instances, the speech analytics system may indicate to the predictive dialer whether the target abandonment rate should be adjusted. In one embodiment, the adjustment of the target abandonment rate may be based on a threshold value and/or an offset applied to the threshold value. Further, in particular instances, the target abandonment rate may be adjusted upwards or downwards to ensure that the actual abandonment rate is within the maximum running average abandonment rate.

The subject matter disclosed herein may be implemented as a computer-controlled apparatus, a computer process, a computing system, or as an article of manufacture such as a computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

Figure 1:
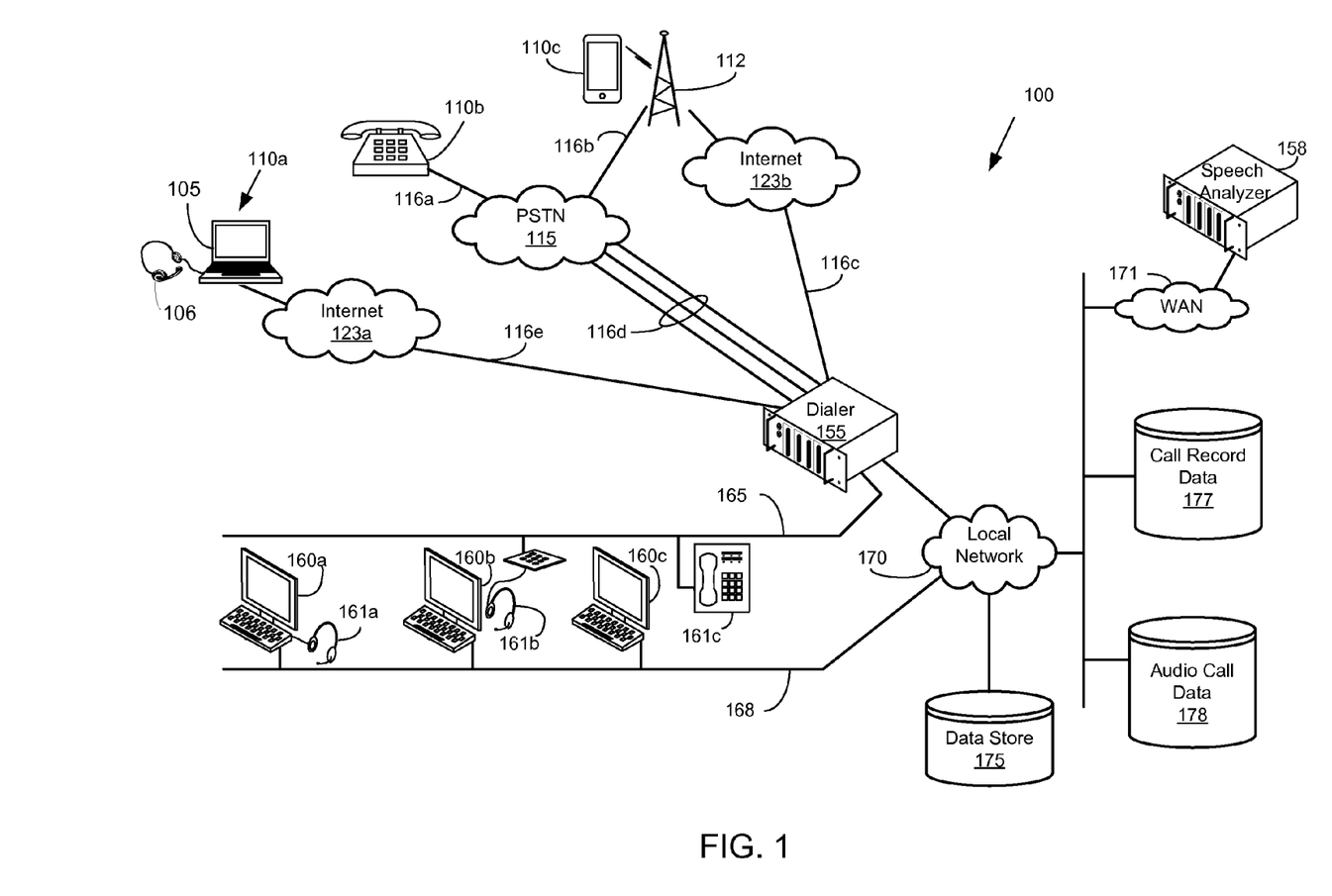
FIG. 1 shows one embodiment of a contact center architecture for which the various technologies disclosed herein can be applied.

FIG. 1 shows one embodiment of a contact center architecture 100 illustrating the various technologies disclosed herein. Although many aspects of contact center operation are disclosed in the context of voice calls, the contact center may process other forms of communication such as facsimiles, emails, text messages, video calls, chat messages, and other forms. The term "party" without any further qualification refers to a live person (as opposed to an answering machine or voice mail service) associated with an instance of communication processed by the contact center.

The contact center shown in FIG. 1 may process voice calls that are originated by a dialer 155. The dialer 155 is typically configured to dial a list of telephone numbers to initiate outbound calls. The list of telephone numbers may be stored in a data store 175 that is accessible using a local network 170. The dialer 155 may directly interface with voice trunks using facilities 116d to the PSTN 115 for originating calls. After the calls are originated, a transfer operation by the dialer 155 may connect the call with an agent, or place the call in a queue for a next available agent. In the latter case, announcements or music may be provided to the party.

In various embodiments, the dialer 155 may be a predictive dialer that makes use of one or more pacing algorithms to determine how and when to dial a list of numbers so as to minimize the likelihood of a called party being placed in a queue while maintaining effective agent utilization. The dialer 155 may "dial ahead" by originating more calls than there are available agents, expecting that some calls will not be answered by live parties, or that an agent may become available.

Outbound voice calls may originate to parties using a variety of phone types. A party may receive a call at a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, asynchronous transfer networks ("ATM") networks, PSTN trunks 116d, or other facilities 116e, 116c.

Voice calls may also be received at a mobile device 110c, such as a smart phone or tablet, which wirelessly communicates with a mobile service provider ("MSP") 112. The voice calls may be routed to the PSTN 115 using an integrated services digital network ("ISDN") interface 116b or other types of interfaces that are well known to those skilled in the art. The MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" as referred to herein is not limited to time-division multiplexing ("TDM") technology.

Voice calls may also be received by a party employing a so-called "IP phone," "VoIP phone," or "soft phone" 110a. In one embodiment, this device may comprise a computing device 105, such as a laptop, desktop, or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

Calls may be routed over facilities 165 to agents for servicing. That is, after a call is originated by the dialer 155 and a called party answers, the call may be connected with an agent. The physical area at which the agent sits is often referred to as an agent "position" and these positions are often grouped into clusters that are managed by a supervisor, who may monitor calls and the agents' productivity. An agent usually uses a computing device, such as a computer 160a-160c and a voice device 161a-161c. The combination of computer and voice device may be referred to as a "workstation." Thus, the workstation collectively has a data capability and a voice capability, though separate devices may be used. In some instances, "workstation" may be used in reference to specifically either the data or voice capability at the agent's position, as appropriate to the context. For example, "routing the call to the agent's workstation" means routing a call to one of the voice devices 161a-161c at the agent's position. Similarly, "routing the call to the agent" means routing a call to the appropriate equipment at an agent's position.

The voice device used by an agent may be a soft phone device exemplified by a headset 161a connected to the computer 160a. The soft phone may be a virtual telephone implemented in part by an application program executing in a computer. The phone may also comprise an Internet Protocol ("IP") based headset 161b or a conventional phone 161c. Use of the term "phone" is intended to encompass all these types of voice devices used by an agent, unless indicated otherwise.

After completing a call, the dialer 155 may generate call record data that is stored in a data store 177 and the data store may include a database. The call record data indicates the progress and status of the call. The call record data may indicate the time the call was originated, the number dialed, disposition, when the call was answered, whether an answering machine was encountered, etc. In some embodiments, this may be integrated with the call records in the data store 175. Further, in some embodiments, separate recordings of the calls maybe stored as audio call data in another data store 178 and this data store may include a database. The audio of the call may be analyzed to ensure that the agents properly handled the call, followed the appropriate procedures, evaluate agent performance, etc. The audio records may be transferred to a speech analyzer 158 via a wide area network ("WAN") 171 or the Internet, which may process the audio records off-site. In some embodiments, the speech analyzer 158 may be offered as a service by another entity, and hence remotely located from the call center.

Although the above components may be variously referred to as a "computer" "processing device," "unit," "component" or "system" and may incorporate therein a local data store or database, or interface with an external database. Use of the word "server" herein does not require the component to interact in a client-server arrangement using web-based protocols with other components, although that may be the case. Further, the above components may be located remotely from (or co-located with) other components. Furthermore, one or more of the components may be implemented on a single processing device to perform the functions described herein.

In addition, the contact center architecture 100 may be provided as a hosted solution, where the call processing functionality is provided as a communication service (a so-called "communication as a service" or "CaaS") to a contact center operator. Thus, there is no requirement that the components identified above must be actually located or controlled by a contact center operator. Specifically, the system and/or the components disclosed herein can be provided on a hosted basis in a variety of configurations.

In addition, the agent positions can be co-located in a single physical contact center or in multiple physical contact centers. The agents can be remotely located from the other components of the contact center, and may also be remotely located from each other, sometimes referred to as a "virtual contact center." A virtual contact center may describe a scenario where agents work at home, using their own computers and telephones as workstations. In some configurations, a single physical location of the contact center may not be readily identifiable. This may occur when the call processing functions are provided as a service in a hosted cloud computing environment and the agent positions are in their individual residences.

Those skilled in art will recognize FIG. 1 represents one possible configuration of a contact center architecture 100, and that variations are possible with respect to the protocols, configurations, facilities, technologies, and equipment used. For example, the speech analyzer 158 may be accessed via the LAN 170 instead of the WAN 171, and the call record data may be integrated with the dialer 155. Other variations on the physical configurations are possible.

Call Abandonment of Telemarketing Calls

An abandoned telemarketing call refers to a telemarketing call that is originated by a predictive dialer, answered by a human (i.e., the call is answered by a live called party that is a person and not, e.g., an answering machine or voicemail system), and is not connected to an agent within two seconds of the called party completing their greeting. Some federal regulations require that the abandonment rate of telemarketing calls does not exceed 3% for a given campaign. Thus, it is important that the predictive dialer pace call origination so that there is a high likelihood of an agent being available to connect to the call when it is answered by a live person. The pacing of the predictive dialer, which may be set by adjusting the target abandonment rate, typically determines the rate at which calls are abandoned and can be controlled in some embodiments by setting the target abandonment rate parameter.

Further, federal regulations also prohibit certain actions by the contact center that would otherwise reduce the likelihood of a call being classified as abandoned. For example, assume the predicative dialer dials two calls on behalf of a single agent and the first answered call is then connected to the agent. The second call could then be immediately terminated by the predicted dialer, thus eliminating any chance that it would be answered. However, federal regulations require that each telemarketing call be allowed to ring for at least four ring cycles or at least 15 seconds before it can be terminated. Thus, if the first call is answered, the second call cannot be immediately terminated unless it has already exceeded the minimum ringing time. If the second call is answered and no agent is available within two seconds to connect to the called party, then the predictive dialer typically plays an announcement to the called party (e.g., indicating to the caller that an agent will be available shortly). This requirement is intended to reduce instances in which the predictive dialer terminates the call after, for example, a single ring and the called party upon picking up the phone simply hears "dead air." However, even if an announcement is provided to the called party to hold for the next available agent in such circumstances, this still is considered an abandoned call.

Measuring the abandonment rate ("AR") can be accomplished in different ways. One approach involves dividing the number calls that are abandoned by the number of calls in the campaign that are answered by a live party, and multiplying the result by 100 to obtain a percentage AR. This approach to determining the AR is termed a "call-based." Generally, telemarketing calls that are answered by an answering machine, encounter an intercept, or are connected to some other automated system (e.g., voice mail) are not included in the determination of the AR. The AR equation is shown in equation 1 below:

$$AR = (\text{Abandoned Calls}/\text{Total Answered Calls}) * 100\% \qquad \text{Equ. (1)}$$

In other instances, the AR is computed on a per-campaign basis. Further, in some instances, the AR can also be expressed as a ratio (as opposed to a percentage), which is often the format used for computational purposes.

In some implementations, the AR is measured on a daily basis. This approach to determining the AR is termed a "day-based." To determine the average AR over a time period, each day's AR is used to compute an average AR over the time period. In many implementations, a 3% maximum average AR limit is used. It is axiomatic that if each day's AR during a time period is less than the limit (e.g., 3%), then the overall AR for that time period must also be less than the limit. Thus, it may be sufficient to prove compliance with federal regulations for a given time period by showing each day in that time period is within the compliance limit.

However, this approach has several deficiencies. First, this approach does not indicate whether compliance for the campaign was achieved over a number of days or one of the days was not in compliance. Specifically, measuring the AR on a daily basis as opposed to determining a running average over some time period (e.g., 30 days or some other multiple) for compliance purposes does not provide an aggregate indication of the compliance rate based on the call volume during the time period. Second, measuring the daily AR rate by itself may not readily facilitate maximizing the performance of the predictive dialer. That is, the predictive dialer may not necessarily know how close to the limit it can operate on a daily basis and still be within compliance over a number of days.

Figure 2:
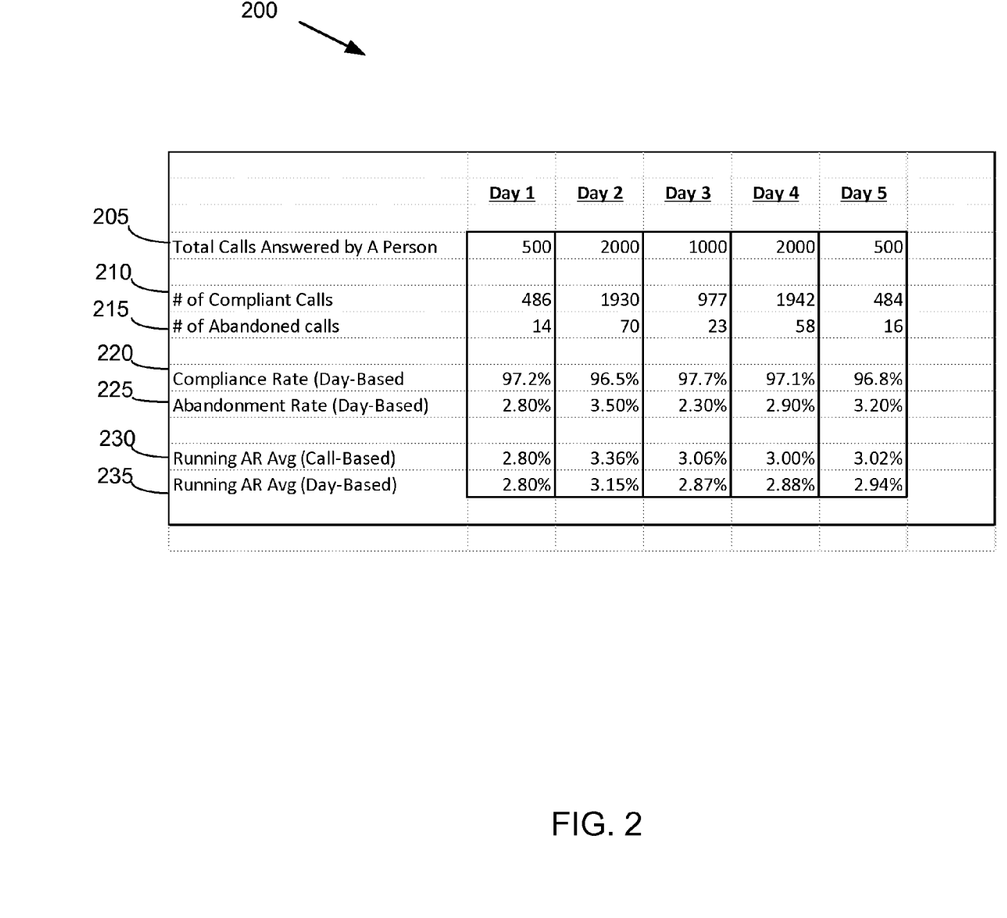
FIG. 2 illustrates one embodiment of a tabular data structure indicating calls made with different abandonment rates.

An illustration can highlight differences associated with using a calls-based running AR average during a time period as opposed to using a day-based running average AR over the same time period. Turning to FIG. 2, a table 200 illustrates data associated with a campaign that is five days long. The first row 205 shows the total number of calls made each day. For purposes of illustration, the campaign shown is limited to five days (1 business week). The number of compliant calls is shown for each day in the second row 210 and the number of abandoned calls in the third row 215.

The fourth row 220 shows for each day the compliance rate ("CR") which is the number of compliant calls divided by the total number of calls answered by persons. Similarly, the AR shown in the fifth row 225 is determined by dividing the number of abandoned calls by the total number of calls answered by a live called party person. The AR can also be easily derived according to equation 2:

$$AR = 1 - CR \qquad \text{Equ. (2)}$$

The sixth row 230 and the seventh row 235 show two different running averages. A running average is the average up to and including that day of the campaign. If the campaign lasts more than 30 days, then federal regulations typically require that only the last 30 days be used in computing a running average. In the calls-based approach shown in row 230, the running average AR is based on all the calls that have been made to date. Specifically, for example, Day 3's running average AR (call-based) is based on the (Abandoned Calls for Day 1+Day 2+Day 3)/(Total Calls for Day 1+Day 2+Day 3), which is 3.06%. The running average AR based on each day is shown in the seventh line 235. This is based on the running average of each day's AR. Thus, for Day 3, the running average AR (day-based) would be (2.80%+3.50%+2.30%)/3=2.87%.

It is apparent that the running average AR may vary depending on the method of computation (at least after the first day). In FIG. 2, the running average AR for the initial day is the same since it is the first day. However, thereafter there is a divergence. In this example, a call center administrator focusing on the running average AR based on a day-based running average (e.g., row 235) may presume that after the first day, all is well since the running average AR of 2.8% is less than the 3% limit. However, after the second day, the administrator may determine the target AR in the predictive dialer is set to too high since the running average AR is now 3.15%, and he may adjust the pacing level accordingly to a lower amount, resulting in a running average AR of 2.87% for the third day. Note that for Day 3, Day 4, and Day 5, the running average AR for each day is less than the target 3%. While the running average AR for Day 2 was slightly above the target rate of 3% at 3.15%, the running average of the campaign appears to be in conformance.

However, if conformance is measured based on the number of calls (e.g., a call-based running average, row 230), then the conformance for Day 2 was actually worse than it appears under a day-based approach (which is 3.36% versus 3.15%). This is because there were four times as many calls made on Day 2 relative to Day 1. Thus, the running average AR by Day 2 is too high, remains over the limit on Day 3, reaches the limit on Day 4, and by Day 5 when the campaign ends, exceeds the allowable rate of 3%. In summary, using the day-based running average misleads the administrator into thinking the center is in compliance whereas the calls-based approach indicates it is not in compliance.

Thus, calculating the running AR average using a day-based approach gives the same weight for the AR of a day involving 50 calls as for the AR for a next day involving 50,000 calls. Factors that may minimize this discrepancy are when the campaign lasts a long time and when each day has approximately the same number of calls. Conversely, the results may be inaccurate if the campaign is short, or when the number of calls varies per day. Because non-compliance can result in significant fines, it is important to not exceed the limit. However, striving for a zero AR can result in decreased efficiencies for the call center operator.

One strategy for ensuring the running average AR for calls of a particular campaign meet the regulatory rate of 3% is to start the campaign with a slightly lower target AR, e.g., 2%. For the first few days, calls can be made while targeting this rate. Assume that the running average AR rate is near this value. For example, assume the running average AR is observed to be 1.9%. In this example, the running average AR based on a call-based approach can be continuously monitored. After a certain time period, such as 5% to 20% (or more) of the campaign's duration, the target AR for each day is modified taking into account the running average AR. For instance, in this example, the target AR can be increased. If the target pacing algorithm is adjusted to a target AR of 3%, then the resulting running average AR for a day cannot exceed 3%. In fact, the target AR could be safely increased to slightly more, based on the number of calls already made and the number of calls expected for that day. For each successive day of the campaign, that days' actual AR will have less of an impact on the overall running average AR. The process can be repeated for the next day. It becomes apparent that it is easier to impact the running average AR by adjusting the target AR rate early on during the campaign, and that adjusting the target AR later in the campaign will have less of an impact on the running average AR. This allows "fine-tuning" of the target AR without surpassing the allowable AR limit. This means that the running average AR will not "roller-coaster" in the latter portion of the campaign, but will follow a steady value.

Figure 3:
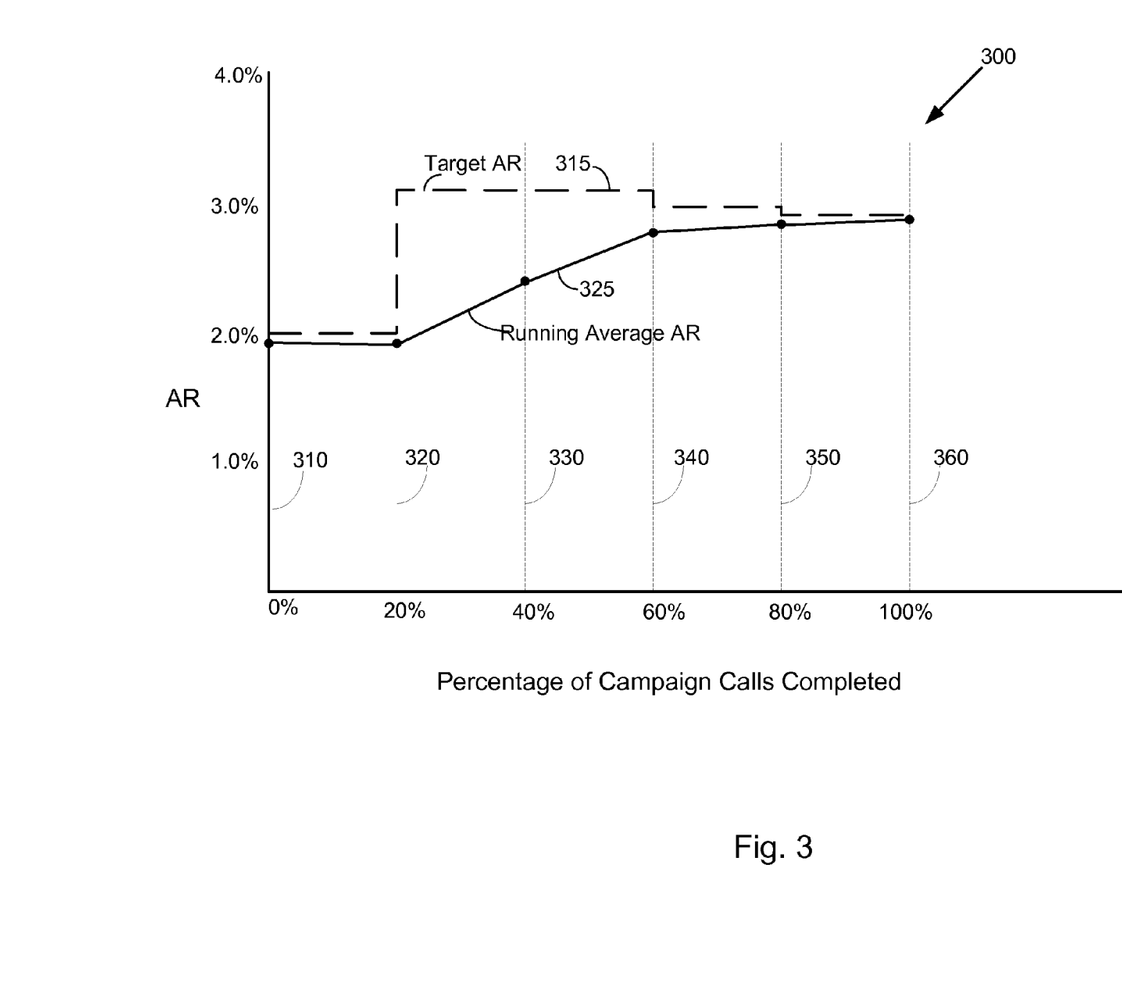
FIG. 3 illustrates one embodiment of the relationship between the running average abandonment rate and the target abandonment rate.

Turning to FIG. 3, the relationship is next examined between the running average AR as measured by the call-based approach and the target AR. This figure illustrates a line graph 300 showing the relationship over the campaign duration. In this example, the duration of the campaign is divided into equal portions 310-360 that represent estimated percentages of the calls that will be placed during a campaign.

While the number of calls attempted in a campaign may not be precisely known until the campaign is completed, accurate estimates can be developed. In some cases, the daily or hourly number of calls is fairly predictable, and in some cases the campaign may be limited to a certain number of call attempts. Thus, in this example, the call center operator can estimate when, e.g., 20% of the calls are made. In some embodiments, the estimate may coincide with the end of each day's calling. Thus, in one embodiment, the graph 300 can be mapped to a five day campaign where each day's calls represents about 20% of the total volume of calls to be made.

In this illustration, the predictive dialer pacing function may have been initially set at a 2% target AR, which is illustrated by the dotted line 315. For a number of reasons, the initial actual AR is slightly below 2%. This may be due to the nature of the algorithm of the pacing function, chance, or unknown circumstances that cause the lower actual AR.

When 20% of the calls are completed, the target AR may be increased to result in a larger running average AR. Since experience from the first day indicates the target AR results in a running average slightly lower than the target AR, the target AR can be set to 3% when 20% of the calls are completed. As calls continue to be attempted, the running average AR increases. The target AR can be re-evaluated periodically (which in this embodiment is at 20%, 40%, 60%, and 80% intervals). When 60% of the calls are attempted, the running average AR 325 is observed to be approximately 2.75%. At this point, the target AR 315 is reduced to 3%. This will cause the running average AR to still increase, but it will likely stabilize below the 3% rate.

The average running AR 325 is impacted less by a change in the target AR 315 when this change occurs at the end of the campaign. Therefore, modifying the target AR in the latter half is less likely to result in a "roller-coaster" effect than adjusting it earlier. Feedback of the running average AR is used to modify the target AR and allows the predictive dialer to safely increase its target AR so that the running average AR approaches, but does not exceed, the allowable maximum value.

If the maximum AR limit is exceeded at any point, continuing calls at a lower target AR will reduce the running average AR, though not as quickly. Thus, reducing the target AR later in the campaign may take some time to reduce the running average AR to an acceptable level. Therefore, it is preferable to set the target AR below the regulatory limit for the initial portion of the campaign, such as during the initial 20% of the campaign, and then to examine the measured running average AR to determined whether to increase (or decrease) the target AR. This ensures that the running average AR gradually increases in a stable and controlled manner.

The amount that the target AR is to be increased may take into account how many calls will be made at the target AR and how many calls have been made. If the running average AR is continuously monitored, then the target AR may be increased (and then decreased) to a greater extent than if the target AR is only infrequently modified.

Figure 4:
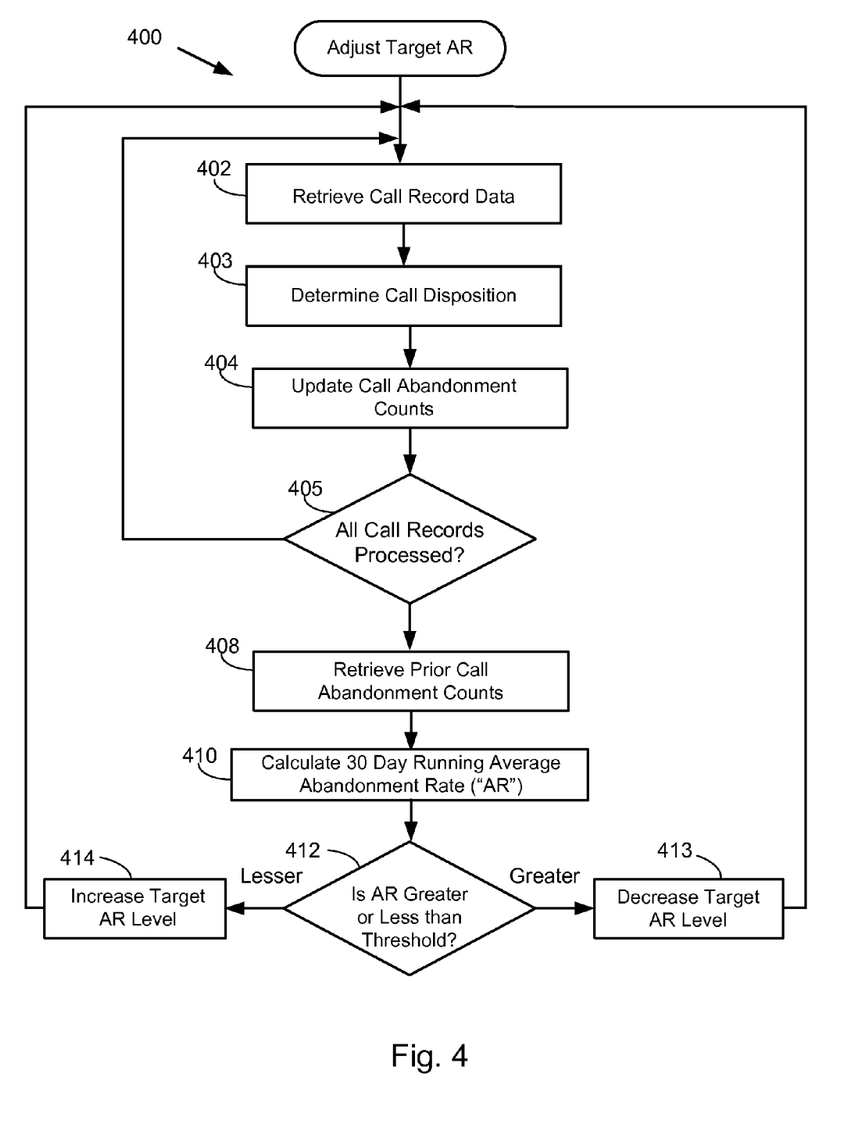
FIG. 4 illustrates one process flow for providing feedback to control the pacing of the predictive dialer.

The periodic process to adjust the target AR can be executed daily, at certain times intervals (every hour or five minutes), after completing certain percentages of call volumes, or after a fixed number of calls (including after every call). In some embodiments, the adjustment can occur every time period or after a certain percentage/number of calls are attempted. Turning to FIG. 4, a process flow 400 is shown for adjusting the target AR in the predictive dialer. The process begins in operation 402 with retrieving the call record data for calls generated since the last computed AR value. In other words, this involves retrieving call record data for calls that were not used in an AR computation. In operation 403, the call record data is examined to determined the disposition, e.g., whether the call was abandoned or not. In some embodiments, this information is included for each call record as soon as the call is completed. If so, then operation 403 merely requires reading the disposition from the call record. In other embodiments, the call record data may be an audio file which is processed by a speech analytics system to ascertain whether the call was abandoned or not.

In operation 404, a counter is incremented that indicates the number of calls which encountered a live party, as is a counter is incremented for the number of abandoned calls, as appropriate. For instance, if the call record reflects the call was abandoned, then the call abandonment counter is incremented. If not, then the call counter for connected to a live party may be incremented. That is, there may be conditions when neither counter is incremented (e.g., the call encounters voice mail). The check in operation 405 determines whether all the call records that were not previously incorporated into the running average AR have been processed. If not, then the process loops back and repeats the processing for the remaining records. At this point, it is possible to determine the running average AR for the call records processed. This could represent, for example, the AR for the current shift or the day.

Once all of the records are tallied, then in operation 408 the prior call abandonment counts are retrieved and processed with the call records just processed to determine a 30-day running average AR in operation 410. In some embodiments, a current running total is maintained after each call is completed. If so, the processing shown in operations 402-410 may be modified so that the same function is accomplished by merely reading the current running average AR for the calling campaign.

In operation 412, a determination is made whether the current AR for the campaign is greater or lesser than a threshold value, which may be is the maximum allowable average AR. The threshold value could be set to 3% (which coincides with federal regulations for the maximum allowable AR for a campaign over a 30 day period). Thus, if the current AR value (e.g., the current running average AR) is over 3%, the target AR for future calls may be decreased, as shown in operation 413. On the other hand, if the current average running AR value is less than the threshold of 3%, then the target AR value may be increased as indicated in operation 414.

Rather than managing to a threshold value which is based on the maximum allowable AR, the threshold may be based on a reduced value relative to the maximum allowable average AR. For example, the threshold value may be based a 0.5% reduction from the maximum allowable running average AR. In other words, the threshold would be 3%-0.5%=2.5%. Thus, if the current running average AR is 2.5% which is equal to the threshold, then no change to the target AR would occur. If the current running AR is above the 2.5% threshold, then the target AR would reduced, and if the AR is below the 2.5% threshold, then the target AR would be increased.

In other embodiments, an offset can be applied to the threshold that defines a range above and/or below the threshold, which causes the target AR to change. Essentially, using an offset can be viewed as redefining the threshold value, either upwards or downwards, but as an independent value. Alternately, an embodiment could define two threshold values that cause the target AR to increase or decrease. Different offsets can be defined for different times in the campaign, and for above or below the threshold. Thus, if the current AR exceeds the offset, the target AR is then changed.

For example, assume a threshold of 2.5%. An upward offset of 0.2% is defined, and a downward offset of 0.5% is defined. If the current AR rises above the threshold plus the upward offset (e.g., 2.5%+0.2%=2.7%), then the target AR will be adjusted downward. If the AR drops below the threshold less the downward offset (e.g., 2.5%-0.5%=2.0%), then the target AR will be adjusted upward. These values may be changed at various points during the campaign. This allows a more or less aggressive response to increasing or decreasing the running average AR. Using an offset to define the point when the target AR is to be changed avoids altering the target AR value when only minor changes are involved. The offsets also allow different responses for increasing versus decreasing the target AR. Further, the offsets allow defining a more aggressive approach at one stage of the campaign and a less aggressive approach at another stage. Defining various offset values can also allow avoid a "roller-coaster" effect in controlling the AR rate over the moving average time period. Other embodiments may use other values or other algorithms for determining a new target AR value based on a threshold.

Once the target AR value is modified, the process then loops back to operation 402 where the process may be repeated at the appropriate periodic time. The frequency at which the process is repeated may vary in various embodiments. For instance, the frequency can range from modifying the target AR value after every call to modifying the target AR value after all the calls for a shift or a day have been completed.

Speech Analyzer Implementation

In some embodiments, a speech analytics system ("SAS") may be used to ascertain whether a given call was abandoned or not, and may also be used to compute the running average AR for calls associated with a campaign. Since the SAS may also be used for reviewing audio content in the call for other reasons, the SAS can also be easily used to determine the running average AR. In such embodiments, the SAS may measure the running average AR and report information back to the predictive dialer to be used by the dialer to alter its pacing, i.e., to alter the target AR the dialer uses on a going-forward basis. In various embodiments, the SAS may inform the predictive dialer of the current running average AR for a campaign after every call, may indicate that a new pacing rate (e.g., a revised target AR value) should be used, or indicate other forms of information that may used by the predictive dialer to revise the target AR value.

Figure 5:
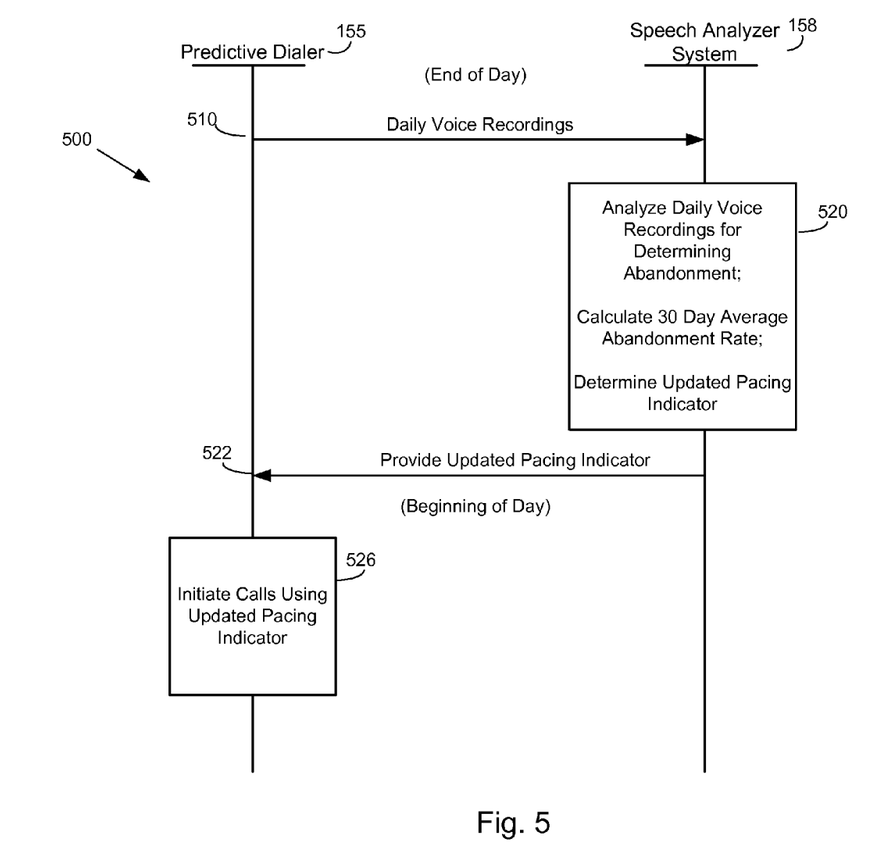
FIG. 5 illustrates one embodiment of a message flow between a predictive dialer and a speech analytics system for controlling the pacing of the predictive dialer.

FIG. 5 illustrates a message flow 500 in one embodiment between a predictive dialer 155 and the SAS 158 where the SAS is used to determine the AR for each call and the current running average AR for a campaign. In this embodiment, the predictive dialer stores audio files of the calls associated with a campaign. These are transmitted periodically to the SAS, which in this embodiment is at the end of each day. In message 510, the predictive dialer transfers the audio voice records to the SAS 158. The SAS may be required to process these audio files during the "off-hours" of the contact center and to report back to the contact center prior to the beginning of the next day.

The SAS may process these calls to ascertain the AR, provide information to the predicative dialer to adjust the target AR, or to verify the running average AR determined by the predicative dialer. The SAS may be used to audit and verify the AR by selectively sampling audio records, or processing all of the audio records. Various embodiments are possible as to how the SAS and the predictive dialer coordinate determining an AR for calls in a campaign.

Thus, the SAS 158 processes the audio files in operation 520 to ascertain which calls were abandoned. This can be accomplished by first determining whether the call was answered by a live party, as opposed to an answering machine or forwarded to a voicemail service. If the call was answered by a live party, the SAS then measures the time from when the called party completes their initial greeting to when a response is received from a live agent at the call center. If this duration is greater than two seconds, then the call is considered to be abandoned. This may be the case regardless of whether the call center plays a prerecorded message or terminates the call. The SAS is typically configured to detect and analyze speech, and so it is well suited for ascertaining when the called party spoke the greeting and when they completed their greeting, distinguishing a live called party for an answering machine, and ascertaining when (if at all) the contact center agent responded.

This determination may be performed for each call, and counters indicating the number of calls answered and the number of call abandoned may be updated as appropriate. These counters can be used to determine the ratio of abandoned calls to all calls that were answered by called parties, and this ratio can be multiplied by 100% to provide the AR as a percentage. In addition, the SAS can also determine a 30-day running average AR. This presumes that the SAS was being used to analyze voice recordings over the previous 30 days, and hence maintains the necessary data for the campaign, or alternatively has access to the data.

The SAS may be configured to also update the target AR value that the predicative dialer should use. In other embodiments, the SAS may merely report the running average AR. Based on this information, the predictive dialer can then update target AR value. In message 522, the SAS provides the information to the predicative dialer, which can comprise the updated target AR value and/or other information.

In operation 526, the predictive dialer begins to initiate calls using the updated pacing indicator (e.g., the updated target AR value). In some embodiments, this operation 526 involves the predictive dialer beginning to make calls using the updated target AR at the beginning of the next day. This allows the SAS to perform its computations at night which are during the "off-hours" relative to the predictive dialer. Thus, the predictive dialer will receive the compliance, AR reports, and any other information from the SAS prior to initiating the next day's calls.

The SAS can also be used to verify the running average AR as determined by the predictive dialer for compliance verification purposes. Thus, the predictive dialer may use call record data for measuring the AR, comparing it with a threshold, formulating a target AR for future calls, and reporting the running average AR over a 30-day period. The SAS can be used to verify these values from the predictive dialer. In other embodiments, the SAS performs these measurements and provides the feedback to the predictive dialer. This can be done on a per-call basis (or number of calls) as well as on a per time-period basis.

Figure 6:
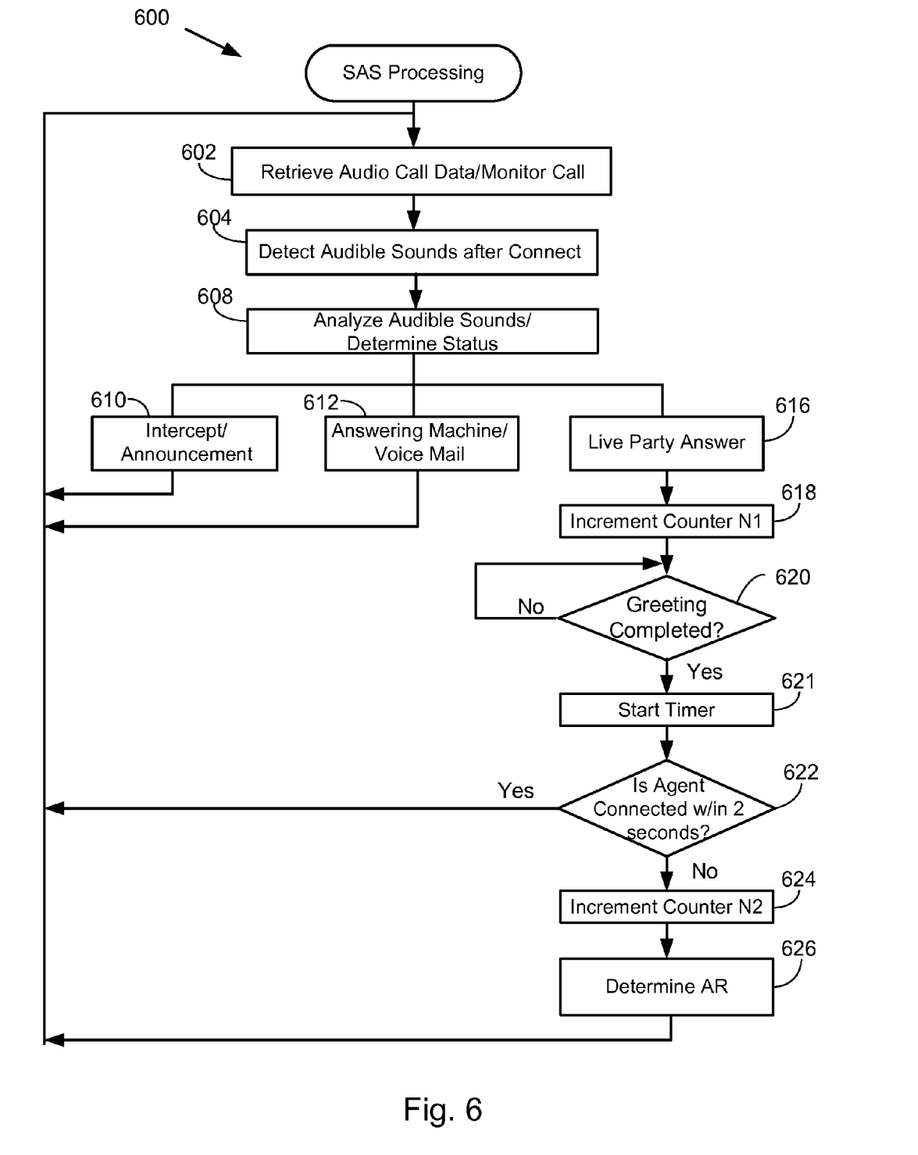
FIG. 6 illustrates one embodiment of a process flow for a speech analytics system analyzing an audio call.

One process flow that the SAS may execute for determining the AR (whether for verification purposes or for controlling the predictive dialer) is shown in FIG. 6. This process 600 can be applied by the SAS to a set of calls in real-time as each call occurs, or the process can be used to analyze a set of recorded audio calls. The latter may be used to batch process recordings made earlier in the day by a predictive dialer. Thus, the initial operation 602 involves processing the stored or real-time audio of a call shortly after it is initiated. In operation 604, audible sounds are detected after a connection has been established. In some embodiments, such as using ISDN facilities, the predictive dialer will receive a CONNECT message indicating a connection has commenced so that sounds after this point are known to occur after connection. The audible sounds may originate from the called party, an answering machine, or some other source.

In operation 608, the audible sounds are analyzed to determine a status of the connection established. It may take a few moments to obtain enough audible sound samples to accurately ascertain the status of the connection. It is possible that the call was redirected to a telephone company intercept or announcement, which may inform the caller that the number is out of service, has changed, or that network conditions render the call unable to be completed. In some circumstances, the status may be indicated by a defined sound cadence that precedes the announcement, which facilitates automated identification of network conditions or intercept announcements. If such is the case, then in operation 610 a determination is made that the connection involves a telephone company intercept or announcement.

In other embodiments, the sounds provided after connection establishment may be a greeting provided by the called party's answering machine, or a greeting associated with a voice mail service. Although these greetings are not preceded by tones, frequently the greeting is followed by a tone that facilitates automatic detection of these systems. The detection of the greeting may occur using other algorithms known in the art, as well. If such is the case, then in operation 612 a determination is made that the connection involves an answering machine or voice mail service.

If either an intercept/announcement or an answering machine/voice mail service is encountered, then no further processing is required with respect to determining the AR. Such calls are not considered abandoned, even if the predictive dialer hangs up after encountering such a condition.

If, however, a live party is determined to have answered the call in operation 616, the SAS then increments a counter N1 in operation 618, which reflects the number of calls that have connected to a live party. The SAS further analyzes the called party's greeting to determine when the called party completed their greeting in operation 620. This can be determined to be the time when the last word is spoken by the called party. At this point, a timer is started in operation 621, and the SAS determines if an agent has been connected to the called party within 2 seconds. In many instances, this determination may be made simply if there are any audible sounds originating from the agent's line within this time. If the answer is yes, then the call is not considered an abandoned call, and the process loops back to repeat the operations for the next call. If the agent is not connected within 2 seconds to an agent in operation 622, then another counter N2 is incremented in operation 624 which represents the number of abandoned calls so far. The SAS then computes the AR in operation 626. In some embodiments, the predictive dialer may insert an audible "click" when the agent is connected to facilitate measurement of this time. The AR can be computed as the ratio of N2/N1, which reflects those calls answered by a live party wherein the called party is not connected to an agent within 2 seconds of completing their greeting. Once this determination in operation 626 is completed, then the process loops back to operation 602 to repeat the operations for the next call.

Exemplary Computer Processing Device

Figure 7:
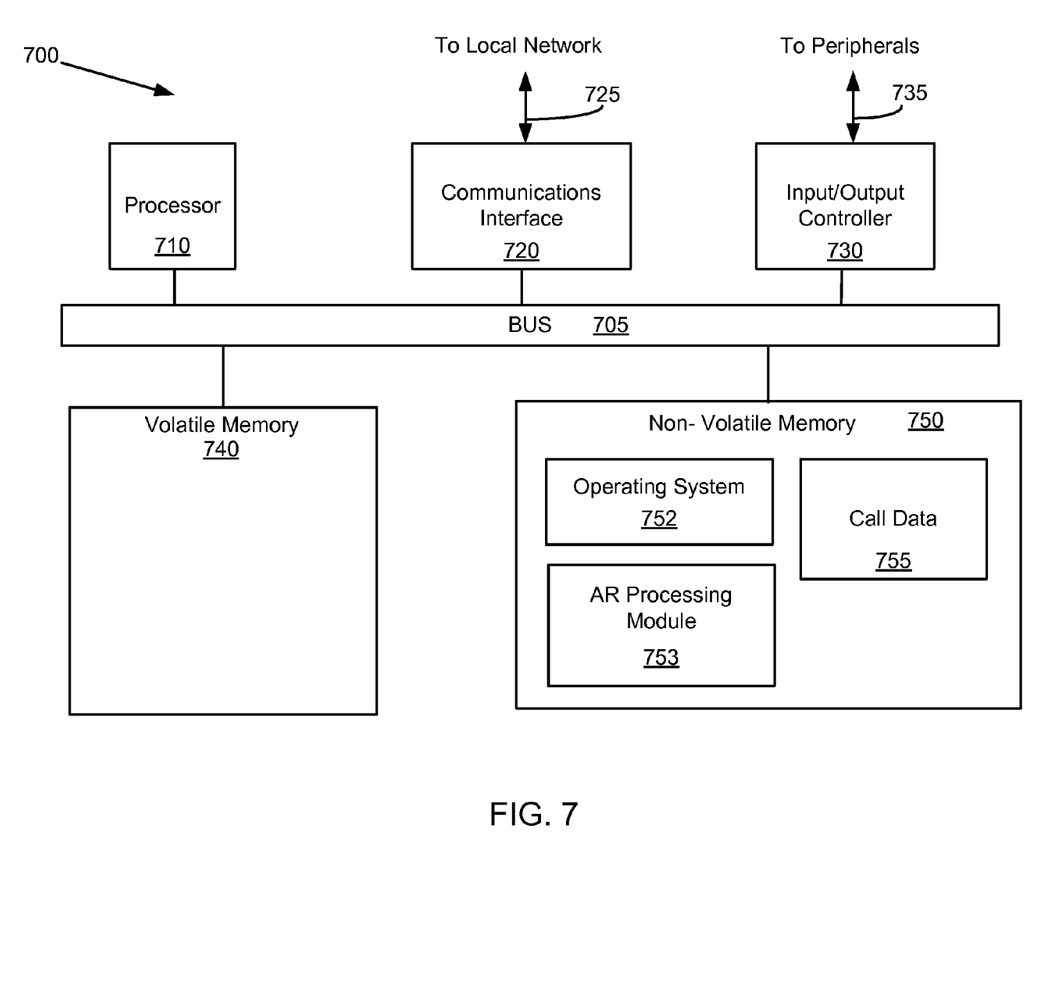
FIG. 7 illustrates one embodiment of a processing device used to practice the technologies disclosed herein.

FIG. 7 is an exemplary schematic diagram of a computer processing system that may be used in an embodiment of the contact center architecture to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 7, the processing system 700 may include one or more processors 710 that may communicate with other elements within the processing system 700 via a bus 705. The processor 710 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 700 may also include one or more communications interfaces 720 for communicating data via the local network 170 with various external devices, including those shown in FIG. 1. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 730 may also communicate with one or more input devices or peripherals using an interface 735, such as, but not limited to: a keyboard, a mouse, a touch screen/display input, microphone, pointing device, etc. The input/output controller 730 may also communicate with output devices or peripherals, such as displays, printers, speakers, headsets, banner displays, etc. These may be used, in part, to receive Administrator input, including for interacting with the manual agent selection module.

The processor 710 may be configured to execute instructions stored in volatile memory 740, non-volatile memory 750, or other forms of computer readable storage media accessible to the processor 710. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 750 may store program code and data, which also may be loaded into the volatile memory 740 at execution time. Specifically, the non-volatile memory 750 may store the AR processing module 753 that may perform the above mentioned process flows and/or operating system code 752 containing instructions for performing the process and/or functions associated with the technologies disclosed herein. The AR processing module 753 may also access, generate, or store the various counters, timers, AR ratios, including the audio call data 755 described above in conjunction with SAS in the non-volatile memory 750, as well as in the volatile memory 740. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 710. These may form a part of, or may interact with, the AR processing module 753. In some embodiments, the AR processing module 753 may be integrated with the predictive dialer, or communicate to the predictive dialer.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system for ascertaining a call abandonment rate for a plurality of calls of a calling campaign originated by a predictive dialer in a call center, the system comprising:
   a speech analytics system configured to:
      ascertain by processing audio of the plurality of the calls originating during a time period comprising thirty or fewer consecutive days, whether each call of the plurality of the calls reaching a live called party is not connected to an agent within a predetermined amount of time after the live called party completes a greeting;
      increment an abandoned call counter in the speech analytics system in response to ascertaining for each call of the plurality of calls reaching the live called party that was not connected to the agent within the predetermined amount of time after the live called party completed the greeting;
      determine the call abandonment rate wherein the call abandonment rate is based on a ratio involving at least a quantity indicated by the abandoned call counter to a total number of the plurality of calls originated during the time period; and
      generate an indication of the call abandonment rate for the time period.

2. The system of claim 1, wherein the speech analytics system is further configured to:
   include in the quantity indicated by the abandoned call counter a number of calls of the plurality of calls originating during the time period that are terminated by the call center within a second predetermined amount of time before being answered,
   wherein the total number of the plurality of calls originating during the time period includes the number of calls of the plurality of calls originating during the time period that are terminated by the call center within a second predetermined amount of time before being answered.

3. The system of claim 1, wherein the speech analytics system is further configured to:
   determine whether the call abandonment rate for the time period is above a threshold value; and
   in response to the call abandonment rate for the time period being above the threshold value, generate a second indication to the predictive dialer indicating a reduction of a target call abandonment rate.

4. The system of claim 3, wherein the plurality of calls originated during the time period comprises a sample of all calls of the calling campaign originated during the time period.

5. The system of claim 1, wherein the speech analytics system is configured to ascertain the call abandonment rate during the time period by processing previously stored audio of the plurality of calls originated during the time period, and wherein and the time period is no more than one day.

6. The system of claim 1, wherein the speech analytics system is configured to:
   indicate to the predictive dialer originating the plurality of calls the abandonment rate for the time period as a running average abandonment rate, and wherein the time period comprises no more than one day.

7. The system of claim 6, further comprising:
   the predictive dialer, wherein the predictive dialer comprises a processor configured to reduce a call establishment rate in response to receiving the running average abandonment rate from the speech analytics system.

8. The system of claim 1, wherein the speech analytics system is configured for each call answered to distinguish between the greeting of the live called party answering the call and a welcome message provided by a voice messaging system answering the call.

9. The system of claim 1, wherein the audio of the call is stored in a memory and the speech analytics system is further configured to:
   retrieve the audio of the plurality of calls from the memory.

10. The system of claim 9, wherein the speech analytics system is configured to categorize the call as abandoned in response to ascertaining the call reaching the live called party was not connected to the agent within the predetermined amount of time.

11. A method for ascertaining a call abandonment rate using a speech analytics system, comprising:
   originating a plurality of calls by a predictive dialer in a call center associated with a calling campaign, wherein the plurality of calls originate over thirty or fewer consecutive days;
   ascertaining by the speech analytics system processing audio of the plurality of calls originated by the predictive dialer during a time period whether each call reaching a live called party was connected to an agent within a predetermined amount of time after the live called party completes a greeting;
   incrementing an abandoned call counter in the speech analytics system in response to ascertaining for each of the plurality of calls reaching the live called party that was not connected to the agent within the predetermined amount of time after the live called party completes the greeting;
   ascertaining by the speech analytics system an abandonment rate based on a ratio involving at least a quantity indicated by the abandoned call counter to a total number of the plurality of calls originated during the time period; and
   generating an indication of the call abandonment rate for the time period.

12. The method of claim 11, wherein the quantity indicated by the abandoned call counter includes a number of calls from the plurality of calls originating during the time period that are terminated by the call center within a second predetermined amount of time before being answered, and
   wherein the total number of the plurality of calls originating during the time period includes the number of calls from the plurality of calls originating during the time period that are terminated by the call center within a second predetermined amount of time before being answered.

13. The method of claim 11, further comprising the steps of:
- recording audio of the plurality of calls associated with the calling campaign; and
- retrieving the audio of the plurality of calls originated during the time period by the speech analytics system for ascertaining whether each call reaching the live called party was connected to the agent within the predetermined amount of time after the live called party completes the greeting.

14. The method of claim 11, further comprising the step of:
- providing the abandonment rate from the speech analytics system to the predictive dialer.

15. The method of claim 11, wherein the predetermined amount of time comprises two seconds.

16. A non-transitory computer readable storage medium storing instructions that when executed by a processor in a speech analytics systems causes the processor to:
- ascertain by processing audio of a plurality of calls originated during a time period of a calling campaign, whether each call is classified as abandoned if the call reaches a live called party and an agent is not connected to the live called party within a predetermined amount of time after the live called party completes a greeting;
- increment an abandoned call counter in response to ascertaining each call is classified as abandoned;
- determine a call abandonment rate wherein the call abandonment rate is based on a ratio involving at least a quantity indicated by the abandoned call counter to a total number of the plurality of calls originating during the time period; and
- generate an indication of the call abandonment rate for the time period.

17. The non-transitory computer readable storage medium of claim 16, further storing instructions, that when executed, cause the processor to provide the indication of the call abandonment rate to a predictive dialer.

18. The non-transitory computer readable storage medium of claim 16, further storing instructions, that when executed, cause the processor to:
- prior to determining the call abandonment rate, include in the quantity indicated by the abandoned call counter a number of calls originated during the time period that are terminated by a call center within a second predetermined amount of time before being answered,
- wherein the total number of calls originating during the time period includes the number calls originated during the time period that are terminated by the call center within a second predetermined amount of time before being answered.

19. The non-transitory computer readable storage medium of claim 16, further storing instructions, that when executed, cause the processor to:
- distinguish for each call answered between the greeting from the live called party and a welcome message provided by a voice messaging system answering the call.

20. The non-transitory computer readable storage medium of claim 16, further storing instructions, that when executed, cause the processor to:
- determine for each call answered by the live called party the time between the live called party completing the greeting for the call and when the agent is connected to the live called party.

\* \* \* \* \*